April 11, 1961  J. STEICHELE  2,979,368
IDLER PULLEYS FOR BELT DRIVES
Filed March 17, 1958  2 Sheets-Sheet 1

INVENTOR
Joseph Steichele
by:
Michael S. Striker
Attorney

April 11, 1961 J. STEICHELE 2,979,368
IDLER PULLEYS FOR BELT DRIVES
Filed March 17, 1958 2 Sheets-Sheet 2

INVENTOR
Joseph Steichele by:
Michael S. Striker
Attorney

United States Patent Office 2,979,368
Patented Apr. 11, 1961

2,979,368

IDLER PULLEYS FOR BELT DRIVES

Joseph Steichele, Stuttgart-Weilimdorf, Germany, assignor to Firma SKF Kugellagerfabriken G.m.b.H., Stuttgart-Bad Cannstatt, Germany Filed Mar. 17, 1958, Ser. No. 721,928

Claims priority, application Germany Mar. 16, 1957

25 Claims. (Cl. 308—190)

The present invention relates to improvements in idler or tensioning pulley assemblies for belt drives, especially for belt drives used in textile machinery. More particularly, the invention concerns an idler pulley which is carried by a single support and is mounted for rotation about at least two groups of annularly disposed rolling elements having a common race.

Proposals were made in the art to press-fit the common outer race into, and support it in, the hub integrally formed with the pulley. This system, however, requires great precision in manufacture to obtain a tight fit of the race in the hub, and the latter must be formed with considerable wall thickness in order to withstand any stresses to which the pulley is subjected. A further drawback of such assemblies is that the tolerance of rolling elements in the common race is changed considerably when the latter is mounted in the hub and the precision of rotational movement is greatly reduced. As before stated, the manufacture of such types of pulleys is rather costly and thus not fully suited for mass production in addition to the fact that interchange and replacement of parts represent considerable problems.

The above enumerated drawbacks of such prior apparatus have led to further proposals, such as, for example, to provide a separate housing for the common race and to fasten the housing to the single support by means of threaded bolts or the like. However, this type of belt tensioning device is also expensive and requires very precise manufacture and time-consuming assembly of its component parts.

An important object of the instant invention is to provide an improved idler pulley for belt drives which is relatively cheap in manufacture, reliable in operation, and permits of convenient access to and replacement of all component parts thereof.

A concomitant object of the present invention is to provide a device of the above character which is so fixed to a single support as to safely withstand any and all stresses to which the pulley is subjected during use.

A further object of the invention is to provide an idler pulley in which certain parts requiring greater precision in manufacture may be so formed as to be usable in more than one form of the novel assembly.

A more specific object of the invention is to provide a common outer race for the rolling elements in an idler pulley of the above described character which is so formed that it can be assembled with other component parts in more than one way.

The above and many other objects of the invention are attained by the provision of an idler pulley assembly which comprises essentially a single supporting element, a pulley having a cylindrical body with a base and a hub fixed to the base, a number of rolling elements disposed in two or more raceways in a shaft fixed to the hub or directly to the supporting element, and a common outer race for the rolling elements which is removably secured to the supporting element when the shaft is fixed to the pulley's hub, or vice versa. The structure for securing the outer race to the hub or to the supporting element comprises a retaining element carried by the outer race and a flange or collar which latter may form part of the supporting element or may be integrally connected with a tensioning element. The tensioning element is preferably externally threaded and either abuts an end face of the outer race to urge the collar tightly against the retaining element and to thus firmly secure the outer race to the pulley or to the supporting element, or it may be rigidly connected or be formed integrally with the flange to cause engagement of the flange with retaining element when moved in axial direction of the outer race.

At least one longitudinal end of the generally cylindrical outer race extends beyond the adjacent group of rolling elements and is formed with an internal or external annular recess for reception of the preferably ring-shaped and removably inserted retaining element. Depending upon the position of the retaining element, i.e. inside or externally of the outer race, the tensioning means, which acts in the axial direction of the outer race, is formed with a flange extending into the outer race or with a collar which abuts against a major surface of the retaining element if the latter is mounted on the periphery of the outer race. This greatly reduces the production costs since the outer race performs a second function of directly supporting the pulley by being directly or indirectly connected with the single supporting element.

According to one embodiment of the invention, the inner diameter of the outer race at its end extending beyond the closest group of rolling elements and abutting against the tensioning means is enlarged with respect to the diameter of bore in which the rolling elements are received, and the retaining element is mounted in the so-formed -bore of greater diameter. The tensioning means may be mounted in the supporting element or in the hub of the pulley proper, and is provided with a flange or boss which is received between the shoulder formed by the two bores of different diameters in the outer race and the retaining element. When the tensioning means moves, it urges the flange against the retaining element and thereby firmly holds the outer race against the supporting element or the pulley's hub, as the case may be. This tensioning means may be formed as a threaded bolt with one end thereof defining the above mentioned flange or boss, and its threaded zone may be received in a nut or like member to tighten the flange against the retaining element carried by the outer race. By bringing the nut into abutment with the stationary support or the pulley body itself, and by further rotating same, the outer race may be moved in axial direction and be drawn tight against the support or the pulley itself. That end of the outer race which faces the tensioning means may be drawn tight directly against the pulley's hub or against the supporting element; in the latter case, a closing member for the open side of the generally cup-shaped pulley may be inserted between the end face of the outer race and the adjacent surface of the supporting element. When the outer race abuts against the hub, the closing member, generally a metallic disc, may be mounted on the shaft and held against the supporting element by a snap ring or the like.

According to a further modification of the present invention, the retaining element may be so mounted as to surround the outer race, and the tensioning means may be carried by the supporting element which latter is then provided with a suitable collar to surround the outer race and to engage a major surface of the retaining element when the tensioning means is drawn tight. This latter device has an externally threaded body so shaped as to be rotatable by a suitable tool and, when rotated to move in a direction toward the adjacent end face of the extended body of the outer race, urges the collar of the supporting element against said retaining element and thus establishes a firm connection between the outer race and the supporting element. One can say that, in accordance with this last described embodiment, a portion of the tensioning means actually forms part of the supporting element which latter, as above stated, carries or is integral with the collar serving as an abutment against the retaining element.

For upkeep of rolling elements in the generally cylindrical outer race, the tensioning means is preferably provided with an axial or axially parallel bore for the passage of lubricant into the axial bore in the outer race, the latter being common to two or more groups of rolling elements. When the tensioning means is externally threaded, it may be provided with a suitable cap having a tapped bore which serves as a receptacle for lubricant and, upon its rotation, doses desired quantities of lubricant into the outer race. If desired, the lubricating channel in the tensioning means may terminate in a nipple for locating the delivery end of a known lubricator or other supply of liquid or pasty material.

As above mentioned, the disc shaped member which closes the open side of the idler pulley may be received directly between the outer race and the supporting element, or it may be mounted on the shaft adjacent to the supporting element, depending upon whether the outer race abuts against the supporting element or against the hub of the pulley assembly. When the retaining element is external to the outer race, the closing disc is preferably formed with a plurality of resilient tongues surrounding a central aperture therein which frictionally receives the outer race and the latter then holds the closing member safely in place even at considerable angular velocities of the pulley assembly.

The above and other features, advantages and attributes of the novel idler or tensioning pulley assembly will become apparent and will be pointed out in greater detail in the course of the following detailed description of three embodiments selected for illustration in the accompanying drawings, wherein.

Figure 1:
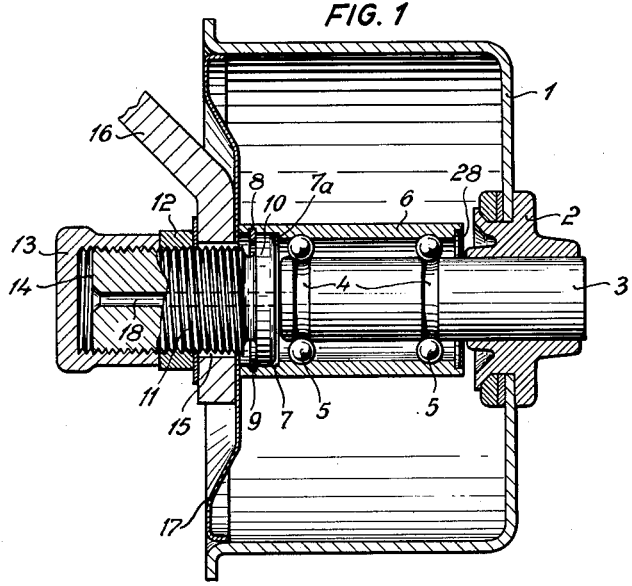
Fig. 1 is an axial section through an idler pulley showing one manner in which it may be mounted on the support.

Referring first to Fig. 1, there is shown a cupped pulley 1 having in its base an axial bore which receives hub element 2 with a short shaft 3 press-fitted into the latter. Shaft 3 is provided with spaced raceways 4 for the rolling elements 5 which are housed in a cylindrical bushing 6, the latter serving as the outer race for said rolling elements. The bore of bushing 6 at its end facing the support 16 is somewhat enlarged, as at 7, and thus forms an interior shoulder 7a serving as an abutment for the flange 10 of a tensioning member 11. Member 11 is in the shape of a threaded bolt and extends with its threaded portion freely through a bore 15 in support 16. The larger-diameter bore 7 in bushing 6 is formed with an annular recess 8, the latter receiving a retaining ring 9 against which the flange 10 abuts. A disc-shaped member 17 closes the open side of pulley 1 and is received between the left-hand end face of bushing 6 and the adjacent surface of supporting element 16. A nut 12 preferably of non-circular contour is screwed tight onto the threaded portion of tensioning member 11 and thus, with the flange 10 bearing against the retaining ring 9, presses bushing 6 against the support 16 with the disc 17 therebetween.

Lubricant for the rolling elements 5 is stored in a cap 13 which is screwed onto the free end of member 11. The latter has an axial bore 18 for the passage of lubricant into the interior of bushing 6. By rotating the internally threaded cap 13, supply of lubricant to the rolling elements 5 may be controlled as desired.

Figure 2:
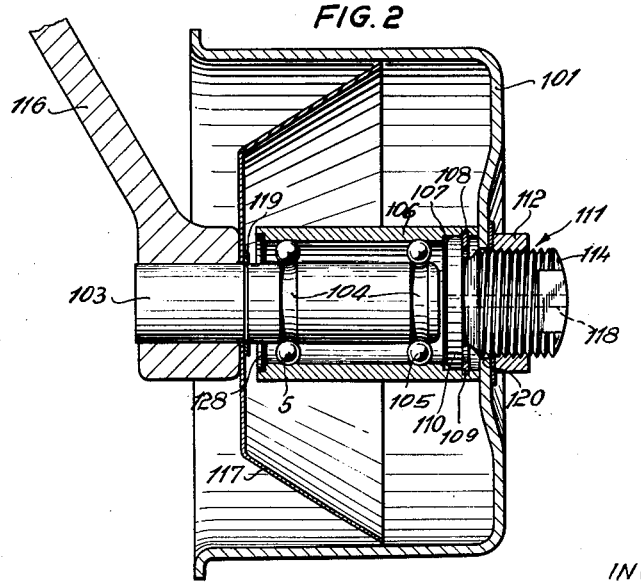
Fig. 2 shows a modified construction of the pulley in similar section.

In the somewhat modified structure shown in Fig. 2, shaft 103 is press-fitted directly into a bore in the supporting member 116. Member 117 which closes the open end of cup-shaped pulley 101 is received between the adjacent surface of support 116 and a retaining ring 119 with the latter extending into an annular recess provided in the periphery of shaft 103. It will be noted that the closing member 117 is slightly differernt from element 17 shown in Fig. 1 in that it has an outwardly flaring portion whose open end faces the base of pulley 101.

The threaded portion 114 of bolt-shaped tensioning member 111 extends through an axial bore 120 in the base of pulley 101 to receive a nut 112 which is drawn tight against the adjacent outer surface of the base of member 101 with a washer interposed therebetween. The end of tensioning member 111 extending into the interior of pulley 101 defines a flange 110 which bears against a retaining ring 109 when the nut 112 is drawn tight. Ring 109 is received in an annular recess 108 in the larger-diameter zone 107 of the axial bore in bushing 106, and thus urges the right-hand end face of the bushing into tight engagement with the base of pulley 101. That portion of shaft 103 which extends into the cylindrical member 106 is formed with raceways 104 for the rolling elements 105, the bushing again serving as the outer race for members 105. Lubricant is supplied through an axial bore 118 in member 111. If desired, a cap similar to member 13 shown in Fig. 1 may be screwed onto the free end of member 114 to serve as a control device for supplying lubricant to the rolling elements 105.

Figure 3:
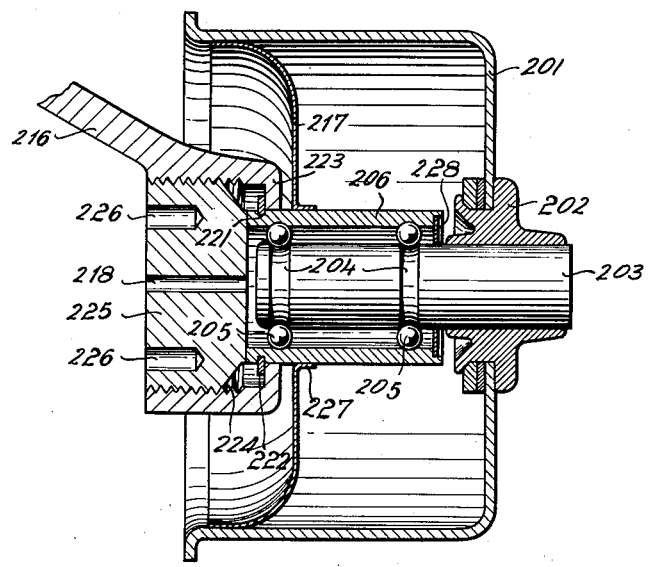
Fig. 3 is an axial section of a further modification.

A further modification of the novel tensioning or idler pulley is illustrated in Fig. 3. In this embodiment, bushing 206 is provided with an external annular recess 221 to receive a resilient retaining ring 222. Support 216 has an annular collar 223 which abuts against the ring 222 when the tensioning element 225 is drawn tight. The latter is received in a tapped bore 224 provided in support 216 and has a pair of recesses 226 for reception of a suitable tool (not shown) by means of which the tensioning element may be screwed into or removed from the support 216. As shown member 225 bears against the adjacent end face of bushing 206 and urges collar 223 against the outer face of retaining ring 222. Lubricant may be supplied to the interior of bushing 206 through an axial bore 218 provided in the tensioning member 225.

Cupped idler pulley 201 is secured to the hub 202 and the latter to shaft 203 in the same manner as described in connection with Fig. 1. Again, bushing 206 serves as the outer race for rolling elements 205 which travel about the shaft 203 in raceways 204.

A cupped member 217, whose purpose is to close the open side of pulley 201, is provided with a cylindrical collar 227 frictionally receiving the bushing 206. Collar 227 may be formed by providing a number of radial cuts into the material surrounding the axial bore in member 217 and by thereupon bending the so-formed prongs or tongues in axial direction of said member.

No cage is shown for the rolling elements 5, 105, 205, but it will be appreciated that, if desired, a cage may be used in each of the above-described embodiments. Also, as illustrated in Fig. 3, the free end of bushing 228 may be provided with an annular recess 228 for reception of a closing disc (not shown) to prevent entry of foreign matter into the interior of member 206.

It will further be understood that the above description of three at this time preferred embodiments should be construed merely in an illustrative and not in a limitative sense since many additional changes and modifications will readily occur to men skilled in the art.

For example, the shape and the manner of engagement of tensioning means with the bushing, and the manner in which the bushing engages with the supporting member or with the pulley itself may be changed in a number of ways. Moreover, depending upon the load to which the pulley is subjected, the number of spaced groups or wreaths of rolling elements may be increased accordingly. Similarly, the manner in which the lubricant is led into the interior of the bushing may be subject to many variations. In order to adapt the bushing for use in either of the above described embodiments, it may be formed with internal and external recesses so as to receive an internal retaining ring (Figs. 1 and 2) or an external ring in accordance with the showing of Fig. 3. All such changes and modifications are believed to be fully within the nature and spirit of the present invention whose true scope is defined in the appended claims.

What is claimed is:

1. An idler pulley assembly comprising, in combination, a supporting member; an idler pulley having a cylindrical portion and a base member; a shaft coaxial with said pulley, fixed to one of said members and extending toward but short of the other of said members; a single outer race coaxially arranged with and surrounding a portion of said shaft and having a free and unengaged cylindrical exterior surface; means coaxial with said shaft and operatively connected to said outer race for pressing said outer race in axial direction toward the other of said members for removably connecing said outer race to the other of said members; and a plurality of annularly disposed rolling elements, located between and engaging said outer race and said shaft.

2. An idler pulley assembly comprising, in combination, a supporting member; an idler pulley having a cylindrical portion and a base member; a shaft coaxial with said pulley, fixed to one of said members and extending toward but short of the other of said members; a single outer race having an end face and being coaxially arranged with and surrounding a portion of said shaft and having a free and unengaged cylindrical exterior surface; means coaxial with said shaft for removably connecting said outer race to the other of said members, said means comprising a retainer ring fixed to said outer race and having an annular face concentric with said end face, and screw means coaxial with said shaft and engaging one of said faces for pressing the other of said faces against the other of said members; and a plurality of annularly disposed rolling elements, located between and engaging said outer race and said shaft.

3. A device for tensioning an endless belt or the like comprising, in combination, a supporting member; a belt engaging member; a shaft fixed to one of said members and extending toward but short of the other of said members; a cylindrical element having an end face and coaxially surrounding at least a portion of said shaft, said cylindrical element having an outer free and unengaged cylindrical surface; at least two groups of annularly disposed rolling elements between said shaft and said cylindrical element; and means for connecting said cylindrical element to the other of said members, said last mentioned means comprising retaining means operatively connected with said cylindrical element, tensioning means operatively connected with the other of said members and movable in the axial direction of said cylindrical element, and means operatively connected with said tensioning means in such a way as to engage said retaining means and to urge the end face of said cylindrical element toward the other of said members when said tensioning means is moved in one direction.

4. A device for tensioning an endless belt or the like comprising, in combination, a supporting member; belt engaging means having a cylindrical body for engaging the belt and a base with a hub member fixed to said base; a shaft fixed to one of said members coaxially with said cylindrical body and extending toward but short of the other of said members; a cylindrical bushing having a bore and an end face and coaxially surrounding at least a portion of said shaft, said bushing having an outer free and unengaged cylindrical surface; means for connecting said bushing to the other of said members, said last mentioned means including a substantially annular retaining element removably received in said bore adjacent to the end face of said bushing and tensioning means supported by the other of said members, said tensioning means being axially movable with respect to said shaft and comprising a portion adapted to abut said retaining element in such a way as to urge the end face of said bushing into engagement with the other of said members; and at least two groups of rolling elements between said bushing and said shaft.

5. A device for tensioning an endless belt or the like comprising, in combination, a supporting member; cupped belt engaging means having a base member; a shaft fixed to one of said members and extending coaxially with said belt engaging means toward but short of the other of said members; a cylindrical bushing having an end face and an annular recess adjacent to said end face, said bushing having an outer free and unengaged cylindrical surface; means for connecting said bushing with the other of said members, said last mentioned means comprising an annular retaining element removably received in said recess and tensioning means so connected with said retaining element as to urge the end face of said bushing toward and into firm engagement with the other of said members; and at least two groups of annularly disposed rolling elements between said shaft and said bushing.

6. A device for tensioning an endless belt or the like comprising, in combination, a supporting member; belt engaging means having a cylindrical portion and a base member; a shaft fixed to one of said members and extending coaxially with said cylindrical portion toward but short of the other of said members; a cylindrical bushing coaxially surrounding at least a portion of said shaft, said bushing having an end face and an axial bore, said axial bore having a zone of smaller diameter distant from said end face and a zone of larger diameter adjacent to said end face, said bushing further having an annular recess in said last mentioned zone and a shoulder between said zones; at least two groups of annularly disposed rolling elements between said shaft and said bushing in the smaller-diameter zone of said bore; and means for connecting said bushing to the other of said members, said last mentioned means comprising a retaining ring in the annular recess in said larger-diameter bore and a tensioning element supported by the other of said members for movement in axial direction of said bushing, said tensioning element having a flange extending into the space between said shoulder and said retaining ring in the larger-diameter zone of said bore and being adapted to engage said retaining ring in such a way as to urge said bushing toward the other of said members when said tensioning element moves in the same direction.

7. A device for tensioning an endless belt or the like comprising, in combination, a supporting member; belt engaging means having a cylindrical portion and a base members; a shaft fixed to one of said members and extending coaxially with said cylindrical portion toward the other of said members; a cylindrical bushing having an end face, a peripheral zone and an annular recess in the peripheral zone adjacent to said end face; at least two groups of annularly disposed rolling elements between said shaft and said bushing; and means for connecting said bushing to the other of said members, said last mentioned means comprising an annular retaining element removably received in said recess and tensioning means supported by the other of said members, said tensioning means comprising a first element and a second element with said first element engaging said retaining element when said second element is moved with respect to the other of said members in the axial direction of said bushing, said bushing having an exterior cylindrical surface which is completely out of engagement with and therefore unstressed by any other element.

8. A device for tensioning an endless belt or the like comprising, in combination, a supporting member; belt engaging means having a cylindrical body for engaging the belt and a base member; a shaft fixed to one of said members and extending toward the other of said members coaxially with said cylindrical body; a cylindrical bushing having a bore and an end face and coaxially surrounding at least a portion of said shaft; at least two groups of annularly disposed rolling elements between said shaft and said bushing; and means for connecting said bushing to the other of said members, said last mentioned means comprising an annular retaining element attached to said bushing adjacent to said end face thereof, a tensioning element operatively connected with the other of said members and mounted for movement in axial direction of said bushing, means operatively connected with said tensioning element in such a way as to firmly engage with said retaining element when said tensioning element is moved in on direction, and means for moving said tensioning element with respect to the other of said members, said bushing having an exterior cylindrical surface which is completely out of engagement with and therefore unstressed by any other element.

9. An idler pulley assembly comprising, in combination, a supporting member; a cup shaped body having a base member; a shaft fixed to one of said members and extending coaxially with said cup shaped body toward the other of said members; a cylindrical bushing having a bore and an end face and coaxially surrounding at least a portion of said shaft; at least two groups of annularly disposed rolling elements between said shaft and said bushing; and means for connecting said bushing to the other of said members in such a way that the end face of said bushing abuts against the other member, said last mentioned means comprising a retaining element in the bore of said bushing adjacent to the end face thereof, and tensioning means including a first element mounted for movement with respect to the other of said members in axial direction of said bushing, and a second element adapted to engage with said retaining element when said first element is moved in one direction, whereby the end face of said bushing is urged toward and engages the other of said members, said bushing having an exterior cylindrical surface which is completely out of engagement with and therefore unstressed by any other element.

10. An idler pulley assembly comprising, in combination, a supporting member; a cup shaped body having an open side and a base member; a shaft fixed to one of said members and extending coaxially with said cup shaped body toward the other of said members; a cylindrical bushing having an end face in the proximity of the other of said members, a bore, and coaxially surrounding at least a portion of said shaft; at least two groups of annularly disposed rolling elements between said shaft and said bushing; means for connecting said bushing to the other of said members, said last mentioned means comprising a retaining element carried by said bushing adjacent to the end face thereof, a tensioning means including a first element supported by the other of said members and axially movable with respect to said bushing, and a second element so associated with said first element as to engage said retaining element and to urge said end face of the bushing in a direction toward the other of said members when said first element is moved in axial direction of said bushing; and means for closing the open side of said cup shaped body anchored between the end face of said bushing and the other of said members.

11. An idler pulley assembly comprising, in combination, a supporting member having a bore and defining a collar coaxial with and spaced from said bore; a cylindrical body having a base spaced from said collar; a shaft fixed in said base and extending coaxially with said collar toward said supporting member; a cylindrical bushing having a bore at least partly receiving said shaft, an end face, and a peripheral recess adjacent to said end face, the portion of said bushing adjacent to said end face extending through said collar and toward the bore in said supporting member; a plurality of rolling elements disposed in at least two annular groups between said shaft and said bushing; a retaining ring in said recess between said collar and said bore in said supporting member; and a tensioning element in the bore of said supporting member so mounted as to be movable in axial directions of and toward the end face of said bushing whereby said retaining element engages said collar to rigidly locate said bushing with respect to said support member, said bushing having an exterior cylindrical surface which is completely out of engagement with and therefore unstressed by any other element.

12. An idler pulley assembly comprising, in combination, a supporting member having a threaded bore and defining a collar coaxial with and spaced from said bore; a cylindrical body having a base and a hub in said base spaced from said collar; a shaft fixed to said hub and extending coaxially with said collar toward said supporting member; a cylindrical bushing having a bore at least partially receiving said shaft, an end face, and a peripheral recess adjacent to said end face, the portion of said bushing adjacent to said end face and defining said recess extending through said collar and toward the threaded bore in said supporting member; at least two groups of annularly disposed rolling elements between said shaft and said bushing; and an externally threaded tensioning element in the bore of said supporting member movable in axial directions of and toward the end face of said bushing whereby said retaining element engages said collar to rigidly locate the bushing with respect to said supporting member, said bushing having an exterior cylindrical surface which is completely out of engagement with and therefore unstressed by any other element.

13. An idler pulley assembly comprising, in combination, a supporting member having a bore; a collar rigidly connected with said supporting member said collar being coaxial with and spaced from said bore; a cylindrical body having a base spaced from said collar; a shaft fixed in said base and extending coaxially with said collar toward said supporting member; a cylindrical bushing having a bore at least partly receiving said shaft, an end face, and a peripheral recess adjacent to said end face, the portion of said bushing adjacent to said end face extending through said collar and toward the bore in said supporting member; a plurality of rolling elements disposed in at least two annular groups between said shaft and said bushing; a retaining ring in said recess between said collar and said bore in said supporting member; and a tensioning element in the bore of said supporting member so mounted as to be movable in axial directions of and toward the end face of said bushing whereby said retaining element engages said collar to rigidly locate said bushing with respect to said supporting member, said bushing having an exterior cylindrical surface which is completely out of engagement with and therefore unstressed by any other element.

14. An idler pulley assembly comprising, in combination, a supporting member having a bore and defining a collar coaxial with and spaced from said bore; a cylindrical body having a base spaced from said collar; a shaft fixed in said base and extending coaxially with said collar toward said supporting member; a cylindrical bushing having a bore at least partly receiving said shaft, an end face, and a peripheral recess adjacent to said end face, the portion of said bushing adjacent to said end face extending through said collar and toward the bore in said supporting member; a plurality of rolling elements disposed in at least two annular groups between said shaft and said bushing; a retaining ring in said recess between said collar and said bore in said supporting member; and a tensioning element in the bore of said supporting member so mounted as to be movable in axial directions of and toward the end face of said bushing whereby said retaining element engages said collar to rigidly locate said bushing with respect to said supporting member, said tensioning element having an axial bore in communication with the bore in said bushing, said bushing having an exterior cylindrical surface which is completely out of engagement with and therefore unstressed by any other element.

15. An idler pulley assembly comprising, in combination, a supporting member having a threaded bore and defining a collar coaxial with and spaced from said bore; a cylindrical body having a base and a hub in said base spaced from said collar; a shaft fixed to said hub and extending coaxially with said collar toward said supporting member; a cylindrical bushing having a bore at least partially receiving said shaft, an end face, and a peripheral recess adjacent to said end face, the portion of said bushing adjacent to said end face and defining said recess extending through said collar and toward the threaded bore in said supporting member; at least two groups of annularly disposed rolling elements between said shaft and said bushing; an externally threaded tensioning element in the bore of said supporting member movable in axial directions of and toward the end face of said bushing whereby said retaining element engages said collar to rigidly locate the bushing with respect to said supporting member, said tensioning element having an axial bore in communication with the bore in said bushing and a portion of said tensioning element normally extending from the threaded bore in said supporting member; and means defining a receptacle for a lubricant having a threaded bore for reception of said portion of the tensioning element therein, said bushing having an exterior cylindrical surface which is completely out of engagement with and therefore unstressed by any other element.

16. An idler pulley assembly comprising, in combination, a supporting member having a bore; a collar rigidly fixed to said supporting member, said collar being coaxial with and spaced from said bore; a cylindrical body having an open side facing said supporting member, a base and a hub in said base spaced from said collar; a shaft fixed to said hub and extending coaxially with said collar toward said supporting member; a cylindrical bushing having a bore at least partially receiving said shaft, an end face, and a peripheral recess adjacent to said end face, the portion of said bushing adjacent to said end face and defining said recess extending through said collar toward the bore in said supporting member; a plurality of rolling elements disposed in at least two annular groups between said shaft and said bushing; means for closing the open side of said cylindrical body fixed to said bushing; a retaining ring in said recess between said collar and the bore in said supporting member; and a tensioning element in the bore of said supporting member so mounted as to be movable in axial direciton of and toward the end face of said bushing whereby said retaining element engages said collar to rigidly locate said bushing with respect to said supporting member, said bushing having an exterior cylindrical surface which is completely out of engagement with and therefore unstressed by any other element.

17. An idler pulley assembly comprising, in combination, a supporting member having a bore; a collar rigidly fixed to said supporting member, said collar being coaxial with and spaced from said bore; a cylindrical body having an open side facing said supporting member, a base and a hub in said base spaced from said collar; a shaft fixed to said hub and extending coaxially with said collar toward said supporting member; a cylindrical bushing having a bore at least partially receiving said shaft, an end face, and a peripheral recess adjacent to said end face, the portion of said bushing adjacent to said end face and defining said recess extending through said collar toward the bore in said supporting member; a plurality of rolling elements disposed in at least two annular groups between said shaft and said bushing; discoid means for closing the open side of said cylinder body, said last mentioned means having an axial aperture and a plurality of resilient prongs surrounding said aperture, said prongs surrounding and frictionally engaging a peripheral zone of said bushing; a retaining ring in said recess between said collar and the bore in said supporting member; and a tensioning element in the bore of said supporting member so mounted as to be movable in axial direction of and toward the end face of said bushing whereby said retaining element engages said collar to rigidly locate said bushing with respect to said supporting member, said bushing having an exterior cylindrical surface which is completely out of engagement with and therefore unstressed by any other element.

18. A device for tensioning an endless belt or the like comprising, in combination, a supporting member having a bore; belt engaging means having a cylindrical body for engaging the belt and a base with a hub member connected to the latter, said hub member having a bore; a shaft press-fitted into the bore of one of said members and extending toward the other of said members coaxially with said cylindrical body; a cylindrical bushing having a bore, an end face, and coaxially surrounding at least a portion of said shaft; at least two groups of annularly disposed rolling elements between said shaft and said bushing; and means for removably and rigidly locating the bushing with respect to the other of said members, said last mentioned means comprising a retaining element in the bore and adjacent to the end face of said bushing, a first tensioning element having an externally threaded portion and a flange extending into the bore of said bushing adjacent to the side of said retaining element facing away from the end face of said bushing with said externally threaded portion extending through the bore in the other of said members, and a second tensioning element having a tapped bore for reception of the threaded portion of said first tensioning element whereby, when the second tensioning element is drawn tight against the other of said members, said flange engages with said retaining element and urges the end face of said bushing in a direction toward and into firm engagement with the other of said members, said bushing having an exterior cylindrical surface which is completely out of engagement with and therefore unstressed by any other element.

19. An idler pulley assembly comprising, in combination, a supporting member having an aperture; a cup shaped device having a base member and an aperture therein; a shaft having an extremity rigidly received in the aperture of one of said members and extending toward the other of said members, said shaft having a peripheral zone and a plurality of annular raceways therein; a cylindrical outer race having an end face adjacent to the other of said members and an axial bore for at least partially receiving said shaft therein; a plurality of rolling elements in each of said raceways disposed between said shaft and said outer race; retaining means removably connected with said outer race adjacent to the end face thereof; an externally threaded element extending through the aperture in the other of said members and movable in axial directions of said outer race; means operatively associated with said externally threaded element for engaging said retaining means and for urging the end face of said outer race in a direction toward the other of said members when said externally threaded element moves in the same direction; and internally threaded means operatively connected with said externally threaded elements and abutting against the other of said members at the side of the latter facing away from said outer race, said internally threaded means being so shaped as to be engageable by a tool or the like for rotating same.

20. An idler pulley assembly comprising, in combination, a supporting member having an aperture; a cup shaped device having a base member and an aperture therein; a shaft having an extremity rigidly received in the aperture of one of said members and extending toward the other of said members, said shaft having a peripheral zone and a plurality of annular raceways therein; a cylindrical outer race having an end face adjacent to the other of said members and an axial bore for at least partially receiving said shaft therein; a plurality of rolling elements in each of said raceways disposed between said shaft and said outer race; retaining means removably connected with said outer race adjacent to the end face thereof; an externally threaded element having an axial bore in communication with the bore in said outer race, said externally threaded element extending through the aperture in the other of said members and movable in axial directions of said outer race; means operatively associated with said externally threaded element for engaging said retaining means and for urging the end face of said outer race in a direction toward the other of said members when said externally threaded element moves in the same direction; internally threaded means operatively connected with said externally threaded elements and abutting against the other of said members at the side of the latter facing away from said outer race, said internally threaded means being so shaped as to be engageable by a tool or the like for rotating same; and an internally threaded cap applied to that end of said externally threaded element which is distant from said outer race; said cap defining a receptacle for lubricant in communication with the bore in said externally threaded element and adapted to supply measured quantities of lubricant into said outer race when rotated with respect to said externally threaded element.

21. An idler pulley assembly comprising, in combination, a supporting member; a cupped member having an open side; a shaft fixed to one of said members and extending toward the other of said members; a hollow cylindrical element removably fixed to the other of said members and coaxially receiving said shaft; rolling elements annularly disposed in a plurality of groups between said shaft and said cylindrical element; and means fixed to said shaft for closing the open side of said cupped member.

22. An idler pulley assembly for tensioning a belt drive or the like which comprises, in combination, a supporting member; a cupped member having an open side facing said supporting member; a shaft within and coaxial with said cupped member, said shaft being fixed to one of said members and extending toward the other of said members; a hollow cylindrical element removably fixed to the other of said members and receiving said shaft, said cylindrical element having an outer free and unengaged cylindrical surface; rolling elements annularly disposed in a plurality of groups between said shaft and said cylindrical element; and means fixed to said cylindrical element for closing the open side of said cupped member.

23. An idler pulley assembly comprising, in combination, a supporting member having a circular bore; a cylindrical body having an open side facing said supporting member, a base spaced from said supporting member, and a hub in said base, said hub having a bore concentric with the bore in said supporting member; a shaft press-fitted into the bore in said hub and extending toward but short of said supporting member, said shaft having at least two spaced annular raceways in its peripheral zone; a cylindrical bushing having an end surface facing said supporting member, a first bore for reception of said shaft, a second bore of larger diameter adjacent to said end surface and communicating with said first bore with said first and said second bores defining a circular shoulder therebetween, and an annular recess in said second bore, said cylindrical bushing having an outer free and unengaged cylindrical surface; a plurality of rolling elements in each of said raceways disposed between said shaft and said bushing; a retaining ring removably inserted into said recess; a first tensioning member having an axial bore and an externally threaded body extending through the bore in said supporting member toward and into said bushing and terminating in a circular flange received between said shoulder and said retaining ring, said flange being of such diameter as to be slidable in said bushing between said retaining ring and said shoulder; a second tensioning member having a tapped bore for reception of the threaded body of said first tensioning member at the side of said supporting member facing away from the end surface of said bushing; an internally threaded cap defining a receptacle for lubricant and screwed onto the threaded body of said first tensioning member adjacent to said second tensioning member; and a discoid member for closing the open side of said cylindrical body, said discoid member having an axial bore receiving said first tensioning member between said supporting member and the end surface of said bushing.

24. An idler pulley assembly for belt drives comprising, in combination, a supporting member having a bore; a belt engaging member having a cylindrical body with an open side facing said supporting member and a discoid base spaced from the latter, said base having a circular bore aligned with the bore in said supporting member; a shaft rigidly received in the bore of said supporting member and extending toward but short of the base of said belt engaging member, said shaft having at least two spaced annular raceways in its peripheral zone; a cylindrical bushing disposed between said supporting member and the base of said belt engaging member, said bushing having an end surface adjacent to said base, a first axial bore adjacent to said end surface, an annular recess in said first bore, and a second axial bore of reduced diameter in communication with said first bore, said first and said second bores defining a circular shoulder therebetween and said shaft extending into said second bore, said cylindrical bushing having an outer free and unengaged cylindrical surface; a plurality of rolling elements in each of the raceways disposed between said shaft and said bushing; a removable annular retaining ring in the recess in said bushing; a first tensioning member having na axial bore, a threaded portion extending through the bore in said base, and a circular flange integral with said threaded portion and extending into said bushing between said shoulder and said retaining ring therein, said flange being of such diameter as to be slidable between the shoulder and the retaining ring in said bushing; a second tensioning member having a tapped bore for reception of the threaded portion of said first tensioning member at the side of said base facing away from said bushing, said second tensioning member being adapted to be drawn tight against said base whereby to urge said flange against said retaining ring and the end surface of said bushing against the base of said belt engaging member; a closing member for sealing the open side of said belt engaging member, said closing member having an aperture for reception of said shaft adjacent to said supporting member; and means for frictionally holding said closing member against said supporting member.

25. An idler pulley assembly for belt drives comprising, in combination, a supporting member having a tubular end portion defining a tapped bore and a collar spaced from and concentric with said bore; a cupped belt engaging member having a cylindrical body with an open side facing said supporting member, a base distant from said supporting member, and a hub fixed to said base and having a bore concentric with said collar; a shaft rigidly received in the bore of said hub and extending toward but short of said supporting member, said shaft having a plurality of annular raceways in its peripheral zone; a hollow cylindrical bushing coaxially surrounding said shaft and extending through said collar, said bushing having an end face adjacent to the bore in said supporting member and an annular recess in its peripheral zone between said collar and the bore in said supporting member, said cylindrical bushing having an outer free and unengaged cylindrical surface; a retaining ring removably received in said recess; a plurality of rolling elements in each of said raceways between the shaft and said bushing; an externally threaded tensioning member received in the bore of said supporting member, said tensioning member having an end face adjacent to the end face of said bushing, an axial bore in communication with the bore in said bushing, and a second end face with at least one axially parallel recess therein, said tensioning member being adapted to be drawn tight against the end face of said bushing for urging said retaining ring against the collar of said supporting member; and a discoid closing member for sealing the open side of said belt engaging member, said closing member having a concentric aperture and a plurality of resilient prongs disposed about said aperture and frictionally engaging a peripheral zone of said bushing.

References Cited in the file of this patent

UNITED STATES PATENTS

| | | |
|---|---|---|
| 2,032,556 | Stahlecker et al. | Mar. 3, 1936 |
| 2,204,084 | Hughes | June 11, 1940 |
| 2,513,599 | Thomas | July 4, 1950 |
| 2,703,261 | Beck et al. | Mar. 1, 1955 |
| 2,728,240 | Stahlecker | Dec. 27, 1955 |
| 2,743,141 | Beck et al. | Apr. 24, 1956 |
| 2,774,113 | Johanson | Dec. 18, 1956 |